United States Patent [19]
Williams

[11] 3,781,676
[45] Dec. 25, 1973

[54] CONTACT STRUCTURE FOR TEST PROBE
[75] Inventor: Robert A. Williams, Fort Worth, Tex.
[73] Assignee: Williams Instruments, Inc., Fort Worth, Tex.
[22] Filed: July 7, 1971
[21] Appl. No.: 160,450

Related U.S. Application Data
[62] Division of Ser. No. 85,693, Oct. 30, 1970.

[52] U.S. Cl. .......... 324/72.5, 339/45 M, 339/177 R
[51] Int. Cl. ........................ G01r 1/06, H01r 13/62
[58] Field of Search ............ 339/45 R, 45 M, 91 R, 339/177 R, 177 E, 255 R; 324/72.5

[56] References Cited
UNITED STATES PATENTS
2,853,690  9/1958  Madison............................ 339/45 R FOREIGN PATENTS OR APPLICATIONS
258,935  2/1965  Australia........................ 339/45 M Primary Examiner—Rudolph V. Rolinec
Attorney—William T. Wofford et al.

[57] ABSTRACT

The specification discloses a test probe having a pair of concentric electrical contact means resiliently mounted at the end region of the body of the probe. The outer contact means is formed in part from a plurality of telescopic bellows, a plurality of which are supported to telescope beyond a forward wall structure. The other of the contact means forms an inner contact and extends through the outer contact.

9 Claims, 3 Drawing Figures

PATENTED DEC 25 1973
3,781,676
SHEET 1 OF 2

CONTACT STRUCTURE FOR TEST PROBE

This application is a division of application Ser. No. 85,693, filed Oct. 30, 1970.

BACKGROUND OF THE INVENTION

1. Field of the Invention

This invention relates in general to electrical test apparatus, and in particular to apparatus for testing the energy level across the electrical contacts in an electrical detonator circuit used to fire a pyrotechnic cartridge in a weapons system such as those used on military aircraft.

2. Description of the Prior Art

Previously, apparatus and systems have been developed for testing detonator circuits in weapons systems to detect spurious electrical energy when the detonator circuit is intentionally energized, or a selected threshold quantity of electrical energy when the system is de-energized.

As explained in U. S. Pat. No. 3,505,635, pyrotechnic cartridges are now extensively utilized in aircraft for ejecting bombs or other weapons. These cartridges are releasably connected with electrical circuitry, which when energized, detonates the cartridge, thus emitting a high-pressure gas which may, for example, release a latching device and immediately thereafter eject a bomb. Such devices have proven dangerous during the arming of aircraft previous to missons. Premature ejection of a bomb occurs upon inserting one of the cartridges into a well in which the detonator circuit has been accidentally or inadvertently energized. Accordingly, it is essential that the detonator circuit of such devices be tested prior to arming the weapons system for the presence or level of electrical energy.

A satisfactory test probe for insertion into a pyrotechnic cartridge well or breech cap is disclosed in U. S. Pat. No. 3,505,635.

SUMMARY OF THE INVENTION

In accordance with the present invention, there is provided an improved test probe and which has universal application. It comprises a body; latching means carried by the body and supported to move outward and inward; and a pair of concentric electrical contact means resiliently mounted at an end region of the body. One of the contact means of the pair is formed in part from a plurality of telescopic bellows. A first spring means engages the contact means formed by the telescopic bellows and a second spring means engages the other contact means.

In the embodiment disclosed, the contact means formed in part from the plurality of telescopic bellows forms an outer contact. The other contact means forms an inner contact and extends through the outer contact.

In a further aspect, a plurality of the telescopic bellows are supported to telescope beyond a forward wall structure of the probe. The first spring means has one end engaging a contact means carried by the body and the other end engaging the telescopic bellow supported to telescope to a maximum distance beyond the forward wall structure.

The test probe having the contact formed in part from the telescopic bellows has advantages in that the contact is expandable to a relatively far distance beyond the forward wall structure and yet it will compress into a small space allowing the test probe to be used for testing many different types of systems.

DESCRIPTION OF THE PREFERRED EMBODIMENT

Figure 1:
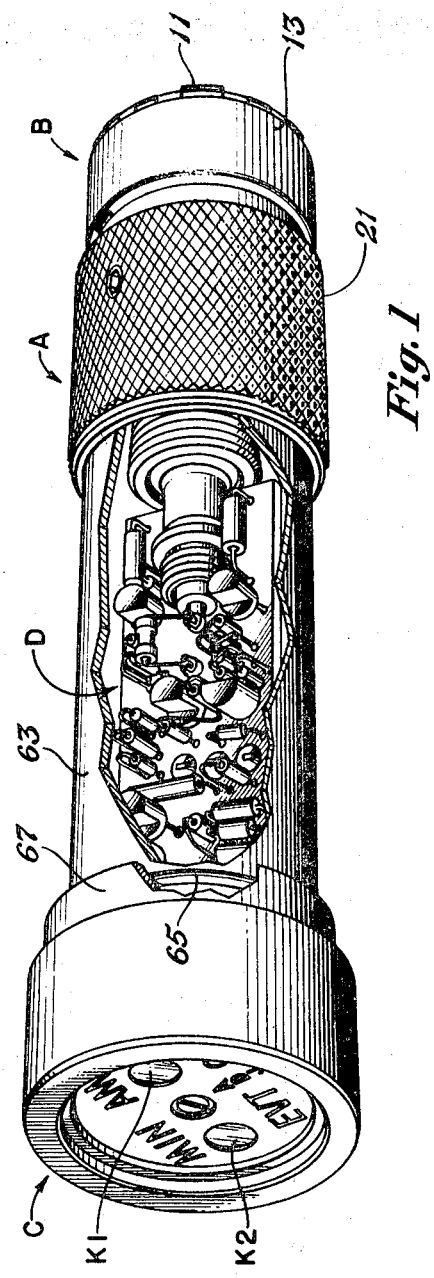
FIG. 1 is a fragmentary, perspective view showing test probe apparatus embodying the principles of the invention.

The letter A in FIG. 1 designates the housing of a test probe, having on one end retainer means B for securing the housing to a relief grove, thread grooves or other indentations in a cartridge well or breech cap of a weapons system. Indicator means C appears on the opposite end of the housing and includes, as will be subsequently explained, a minimum event indicator and a threshold indicator, as well as circuit means D connected with electrical contacts (not shown in FIG. 1) generally circumscribed by the retainer means B.

Figure 3:
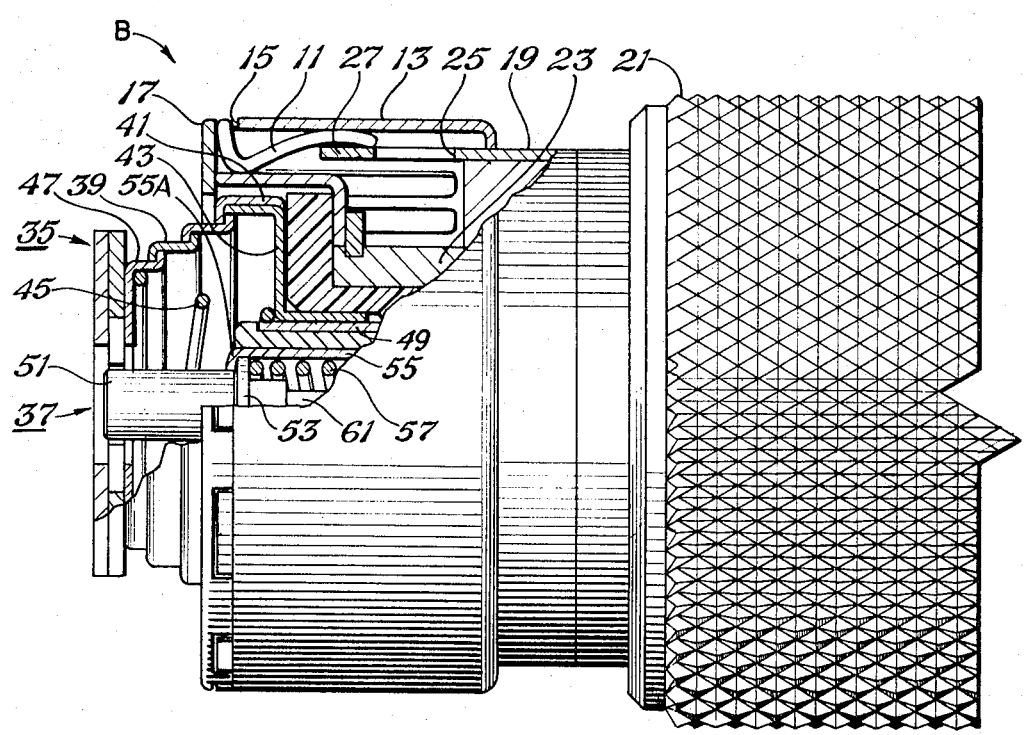
FIG. 3 is a fragmentary, side elevation view, in longitudinal section showing the electrical contacts and retainer means that form a portion of the test probe apparatus shown in FIG. 1.

With refernece to FIG. 3, the retainer means B consists of a plurality of latch elements 11, portions thereof adapted to extend outward beyond the periphery of an annular shell 13 through apertures 15 adjacent a forward wall 17. A ring portion 19 is carried by a movable shell 21 mounted on a body 23 for reciprocal movement thereon, the ring portion having a plurality of circumferentially spaced apertures 25 adjacent and behind forward lips 27. When the lips 27 are urged forward, they engage the extreme end of each associated latch element to force it outward through the aperture 15, the opposite end of the latch element falling partially within the aperture 25 of the ring portion 19. Upon retraction of the movable shell 21 and ring 19, the lips 27 of the ring move rearward to the position shown in FIG. 3 such that the latch elements 11, due to their arcuate configuration shown, are retracted from the aperture 15. Hence, the latch elements may be made to engage or disengage thread grooves, relief grooves, or indentations formed inside a cartridge well or breech cap, as is explained in greater detail in a copending application entitled *Latch Type Pyrotechnic Detonator Circuit Test Probe*, Ser. No. 777,674, filed Nov. 21, 1968.

Two electrical conductors 29, 31 connect respectively with inner contact means and outer contact means that lead to a resiliently mounted inner electrical contact 37 and a resiliently mounted outer contact 35. The outer contact 35 consists of an exterior plate engaged by a plurality of telescopic bellows 39, the larger and outer of which 41 is secured to an annular plate 43. A conical spring 45 connects between the smaller of said bellows 47 and the axially extending sleeve 49 that forms apart of the outer contact means. The outer contact 35, bellows 39, concical spring 45, plate 43 and sleeve 49 are all electrically conductive such that electricity flows therethrough from the contact 35 to the conductor 31.

The inner contact means includes an axially extending sleeve 55 and reciprocably mounted button 51 having an interior flange 53 retained by the lip 55A on the sleeve 55, with a compression spring 57 being mounted between the flange 53 and an opposing shoulder on a mandrel 61. Thus, both the inner and outer contact means have linear movement for positive engagement with the contacts inside the cartridge well or breech cap of the weapons release apparatus.

As also shown in FIG. 1, an interior section 63 of the test probe housing consists of a sleeve and preferably utilizes an O ring 65 for engagement with a cap 67 that houses a minimum event indicator K2 and a threshold indicator K1. Thus, the contact end and indicator ends of the housing are retained to the sleeve 63 preferably by threaded connections as shown in FIG. 1.

Figure 2:
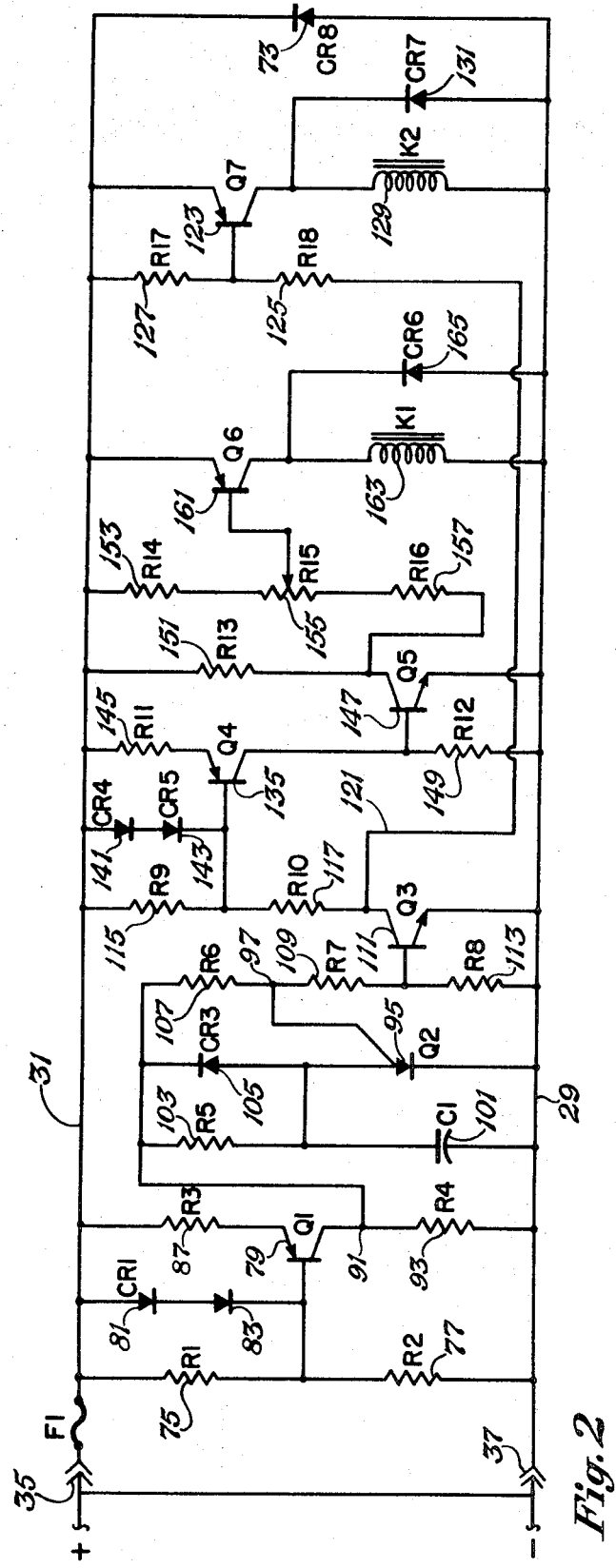
FIG. 2 is a circuit diagram of the circuit means including a minimum event indicator to sense a selected minimum quantity of electrical energy, and a threshold indicator for sensing a selected quantity of electrical energy above said minimum.

The circuit means D located within the sleeve 63 of the test probe is illustrated schematically in FIG. 2, where the outer and inner contacts are represented by the numerals 35 and 37 for connection respectively with the conductors 31 and 29, the contacts being referred to sometimes as input terminals in the following circuit description.

A preferably five amp fuse (F1) 71 is connected in the conductor 31 for current protection against excessively high current. The diode (CR8) 73 prevents reversing polarity from damaging the circuit, although in practice this should not occur since the cartridge well or breech cap apparatus in the weapons system provides the correct and positive polarization. Biasing resistors (R1) 75 and (R2) 77 are serially connected with conductor 31 and the common or ground 29.

A transistor (Q1) 79 has its base connected with the juncture of resistors (R1) 75 and (R2) 77. The two diodes (CR1) 81 and (CR2) 83 are also connected with the base of the transistor (Q1) 79, while the resistor (R3) 87 is connected with the emitter of transistor (Q1) 79 to provide a constant current capability by limiting the current flow through the transistor (Q1) 79. Expressed otherwise, the transistor (Q1) 79 in combination with the resistor (R3) 87 and the two diodes (CR1) 81 and (CR2) 83 provide a constant current means or section to give a constant voltage output at the juncture 91 of the collector of the transistor (Q1) 79 and resistor (R4) 93. This allows a predictable time build-up for the programmable unijunction transistor (PUT) 95 (Q2) with its emitter and collector connected in the circuit at terminals 97, 99 such that the voltage at terminal 97 is preferably 0.6 volts higher than at terminal 99 for the purpose of turning on transistor (Q2) 95.

A capacitor (C1) 101 and resistance (R5) 103 of a RC network are connected with the juncture 91 between the collector of the transistor (Q1) 79 and resistance (R4) 93 such that the capacitor (C1) 101 starts charging through the resistor (R5) 103. The transistor (Q2) 95 is connected through terminal 99 with the juncture of resistor (R5) 103 and the capacitor (C1) 101 and with the ground or conductor 29. A diode (CR3) 105 is connected with terminal 99 and the juncture 91 to provide a discharge path so capacitor (C1) 101 can discharge rapidly when the transistor (Q1) 79 turns off. PUT transistor (Q2) 95 is also connected with terminal 97 at the juncture of the biasing transistors (R6) 107 and (R7) 109, terminal 97 also being connected with transistor (Q2) 95 as shown.

The base of a transistor (Q3) 111 is connected at the juncture of the resistor (R7) 109 and a resistor (R8) 113 in series therewith that is also connected with the ground or conductor 29. Accordingly, when the transistor (Q3) 95 turns on, the transistor (Q3) 111 is rendered conductive. The collector of transistor (Q3) 111 biasing resistors (R9) 115 and (R10) 117, are serially connected with the conductor 31 and conductor 29. The resistor (R9) 115 insures that the transistor (Q4) 119 is turned off when transistor (Q3) 111 turns off.

The collector of transistor (Q3) 111 is connected through conductor 121 with the base of a transistor (Q7) 123 by way of a biasing resistor (R18) 125. Another resistor (R17) 127 is serially connected with the base of transistor (Q7) 123 and with the conductor 31. The resistors (R17) 127 and (R18) 125 are biasing resistors to protect the transistor (Q7) 123 by limiting the base current flowing through it. When the transistor (Q3) 111 is rendered conductive, the conductor 121 and hence the base of the transistor (Q7) 123 is brought to ground to turn on its transistor and trip minimum event indicator (K2) 129. The diode (CR7) 131 connected across the indicator (K2) 129 and between the collector of the transistor (Q7) 123 and the conductor 29 provide polarity protection. When the transistor (Q3) 111 is rendered conductive, the transistor (Q4) 135 is rendered conductive, since its base is connected with the juncture of resistors (R9) 137 and (R10) 139 that are serially connected with conductor 31 and the juncture of the collector of the transistor (Q3) 111 and conductor 121. Similarly, as with the transistor (Q1) 79, the transistor (Q4) 135 also has diodes (CR4) 141 and (CR5) 143 connected with its base and with conductor 31. A resistor (R11) 145 is connected with the emitter of the transistor (Q4) 135 to provide constant current safety to limit the current available to the base of a transistor (Q5) 147. When the transistor (Q4) 135 is rendered conductive, transistor (Q5) 147 is rendered conductive, since the base of transistor (Q5) 147 is connected with the juncture of the collector of transistor (Q4) 135 and biasing resistor (R12) 149 that is connected with the base of transistor (Q5) 147 and the ground or conductor 29 to insure that the transistor (Q5) 147 is turned off when the transistor (Q4) 135 is turned off.

The transistor (Q5) 147 impresses the basic load (R13)151 of 1.5 ohms into the circuit. The transistor (Q5) 147 compensates for the effect of other elements in the circuit which tend to make the basic load vary from 1.5 ohms. Expressed otherwise, the basic load (R13) 151 and the transistor (Q5) 147 are serially connected with the conductor 31 and the ground 29. The biasing resistor (R14) 153, the potentiometer (R15) 155, one form of variable resistance means, and the biasing resistor (R16) 157 are serially connected with conductor 31 and the juncture of the collector of transistor (Q5) 147 and the resistor (R13) 151. The output terminal 159 of the potentiometer (R15) 155 is connected with the base of a transistor (Q6) 161 that has its emitter connected with conductor 31 and its connector connected with the indicator (K1) 163, which has a diode (CR6) 165 connected thereacross as shown to provide polarity protection.

The potentiometer (R15) 155 is set by adjusting the circuit pulses 10 milliseconds wide and applying a current of 3 amps and a voltage of 4.5 volts across the 1.5 ohm resistance (R13) 151, thereafter adjusting the potentiometer until the indicator (K1) 163 will initially actuate.

When the transistor (Q5) 147 is rendered conductive, the transistor (Q6) 161 is also rendered conductive to begin to actuate the indicator (K1) 163.

When the transistor (Q5) 147 is rendered conductive, the transistor (Q6) 161 is rendered conductive to begin to actuate the energy operated indicator (K1) 163. If suitable current is applied for a suitable interval of time, the indicator (K1) 163 will be actuated to indicate suitable power to fire pyrotechnic cartridges to be subsequently in the cartridge well or breech cap.

Operationly, the circuit is designed such that it takes 10 milliseconds for the transistor (Q2) 95 to turn on after the contacts 35, 57 are energized by the firing system of aircraft. When the transistor (Q2) 95 turns on, the voltage at terminal 97 is dropped to ground and the transistor (Q3) 111 is turned off. The transistors (Q4) 119 and (Q7) 123 are similarly turned off, as is the transistor (Q5) 143. In the event there is not sufficient power for suitable period of time to energize the 3 ampere indicator (K1) 163, but there is a minimum of 1 ampere of current, the indicator (K2) 129 will be actuated. The transistor (Q1) 79 remains conductive and the transistor (Q2) 95 latches on so long as the input terminals are connected with the leading terminals inside a cartridge well or breech cap. The indicators (K1) 163 and (K2) 129 are retained in their respective positions until reset. No changes are experienced in the circuit thereafter until the input terminals 35, 37 are disconnected from the power source.

The indicators (K1) 163 and (K2) 129 are preferably of the magnetic latching type such as those sold under the trademark "Minelco," a subsidiary of General Time of Holbrook, Massachusetts, as shown in their Bulletin B-11A entitled "Miniature Bite Indicator," Model BHG21T, having a rating of 3 volts and 13.8 ohms. However, any indicator means is within the broad scope of the invention, including indicator using liquid crystal technology as explained in the July 6, 1970 issue of *Electronics*, the McGraw Hill Publication, page 64.

While the invention has been shown in only one of its forms, it should be apparent to those skilled in the art that it is not so limited but is susceptible to various changes and modifications without departing from the spirit thereof. For example the invention in its broadest aspects is not limited to the specific structures shown and the various element values are given only by way of sample.

I claim:

1. A pyrotechnic detonator test probe comprising:
   a body,
   a latching means carried by said body and supported to move outward and inward,
   a pair of concentric movable electrical contact means resiliently mounted at an end region of said body,
   one of said contact means of said pair being formed in part from at least two telescopic bellows movable with respect to each other and with respect to said body,
   first spring means engaging said contact means formed by said telescopic bellows for normally biasing said bellows outward, and
   second spring means engaging the other of said contact means of said pair for normally biasing said other contact means outward.

2. The probe of claim 1 wherein said contact means formed in part from said telescopic bellows forms an outer contact;
   the other of said contact means of said pair forming an inner contact and extending through said outer contact.

3. The test probe of claim 1, comprising:
   forward wall structure having an aperture formed therein,
   said pair of concentric movable electrical contact means being supported to extend through said aperture for movement within said aperture and beyond said forward wall structure,
   said telescopic bellows being movable with respect to each other and with respect to said forward wall structure and supported to telescope beyond said forward wall structure,
   said first spring means having one end engaging a contact means carried by said body and the other end engaging the telescopic bellows supported to telescope to a maximum distance beyond said forward wall structure.

4. The test probe of claim 3 wherein:
   said contact means formed by said telescopic bellows forms an outer contact;
   the other of said contact means of said pair forming an inner contact and extending through said outer contact.

5. The test probe of claim 4 wherein the telescopic bellows supported to telescope to a maximum distance beyond said forward wall structure is the smallest telescopic bellows.

6. The test probe of claim 5 wherein said first spring means comprises a conical shaped spring,
   the largest end of said spring engaging the smallest telescopic bellows.

7. The test probe of claim 6, wherein:
   said telescopic bellows comprise three bellows movable with respect to each other and with respect to said forward wall structure and adapted to telescope beyond said forward wall structure.

8. The test probe of claim 5 wherein said smallest telescopic bellows is adapted to telescope beyond said other movable electrical contact means.

9. The test probe of claim 8, wherein:
   said telescopic bellows comprise three bellows movable with respect to each other and with respect to said forward wall structure and adapted to telescope beyond said forward wall structure.

* * * * *